Figure 1:
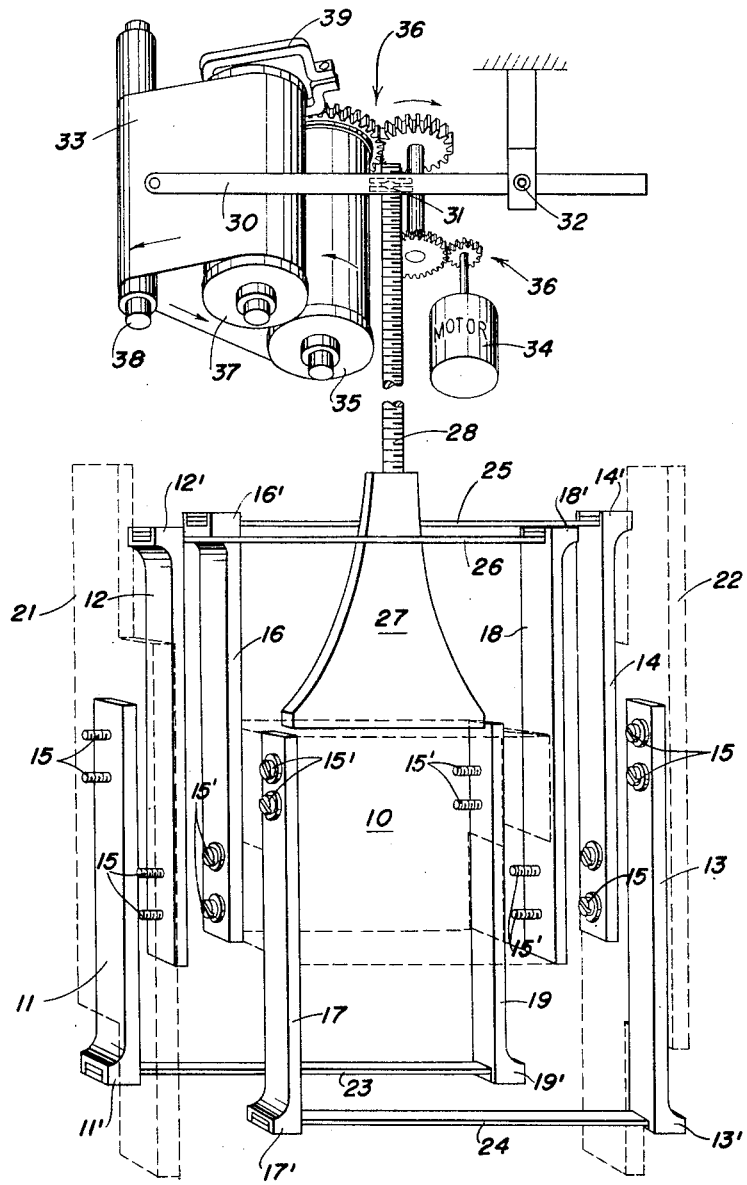

Inventor
HARRY C. MAYNARD

Aug. 21, 1951 H. C. MAYNARD 2,564,705
ACCELEROMETER
Filed Dec. 12, 1947 2 Sheets-Sheet 2

Inventor
HARRY C. MAYNARD
By G. D. O'Brien
Attorney

Patented Aug. 21, 1951

2,564,705

UNITED STATES PATENT OFFICE 2,564,705

ACCELEROMETER

Harry C. Maynard, United States Navy

Application December 12, 1947, Serial No. 791,445

4 Claims. (Cl. 264—1)

(Granted under the act of March 3, 1883, as amended April 30, 1928; 370 O. G. 757)

The present invention relates to accelerometers and more particularly to a new and improved elastic system for accelerometers.

An accelerometer for the purpose of this specification may be defined as a spring-supported sensitive mass whose motion relative to a given body is damped, the relation between the mass, spring constant, and damping being so adjusted that displacements of the mass relative to the body are proportional to accelerations to which the body may be subjected. The theory of such an instrument is extensively presented in a paper by C. S. Draper and Walter Wrigley, published in Journal of the Aeronautical Sciences, vol. 7, July 1940, No. 9, pages 388–401.

The elastic system for accelerometers of this invention consists of a novel arrangement of relatively thin flat springs and relatively thick cantilevers and provides an effectively frictionless support for the sensitive mass, providing one direction linear motion of the mass that is insensitive to side forces. Moreover, the elastic system of suspension for the mass provides a high and undamped natural frequency so that it may properly respond to rapidly obtained values of peak acceleration.

It has been observed that the usual accelerometer, consisting of a mass suspended by a helical spring with guide rods or bearings for restraining the system to linear motion, is unsuitable for measuring accelerations of a torpedo, for example, under various launching conditions because of the unpredictable effect of the coulomb friction introduced by the supporting members. Attempts to reduce mechanical friction through the utilization of rollers or ball-bearings have been generally unsatisfactory because such bearings present a varying mechanical friction under side forces that make the performance of the instrument unreliable.

Accordingly, a principal aim of this invention is to devise a spring system which is relatively insensitive to side forces, and which has negligible coulomb effects.

As noted from the definition, supra, all instruments of the type herein presented must be damped. The electromagnetic forces, air, and fluid are commonly employed as damping means in accelerometers. I observed that the employment of electromagnetic and air damping requires units too large for the specific purpose for which the accelerometer of this invention is to be applied. Accordingly, fluid damping was selected for illustration with the understanding, however, that the invention is not limited to the utilization of fluid damping, since the invention may have application in an environment wherein size is of slight importance.

The main disadvantage in fluid damping is the variations in viscosity that accompany temperature changes. It is advantageous, therefore, to utilize such fluids that have a low viscosity-temperature index.

Accordingly, the object of this invention is to provide an improved accelerometer.

It is a more specific object of this invention to provide a support for the sensitive mass of an accelerometer that permits substantially frictionless linear movement in one direction only with relative insensitivity to side forces.

Figure 2:
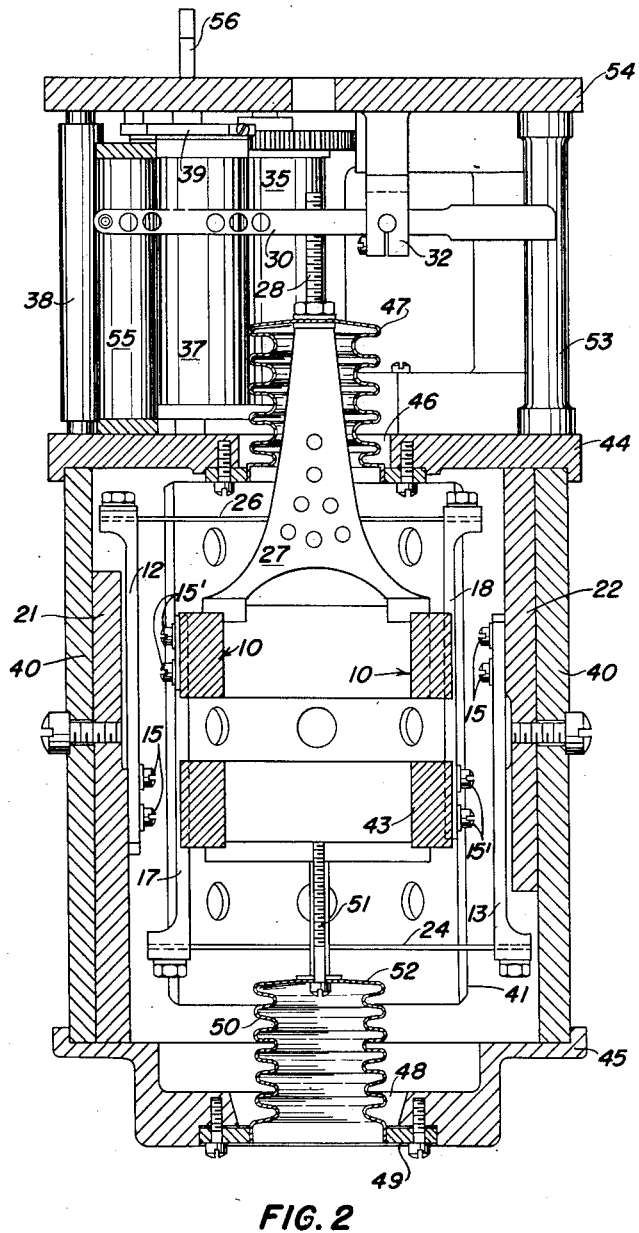

The above and other objects and advantages of the present invention will appear more fully hereinafter from a consideration of the detailed description which follows, taken together with the accompanying drawings, wherein:

Fig. 1 is a schematic perspective view showing the elastic system of the present invention supporting a seismic mass operatively secured to the recording arm of a drum type recorder; and Fig. 2 is an elevational view in cross section of an accelerometer assembly built in accordance with the present invention.

Referring now to the drawings there is illustrated in Fig. 1 the spring system of this invention, for supporting the sensitive mass. The sensitive mass shown in this figure in dotted lines at 10 is supported by the spring system, which as illustrated consists of eight cantilevers, four being secured to the reaction mass 10 and four being secured to the cantilever mounting plates 21 and 22. The mounting plates 21 and 22 are shown only in dotted lines and are adapted to be secured to the casing 40 at substantially diametrically opposed positions.

It is advantageous to consider the cantilevers as comprising two separate groups or sets, the first set of cantilevers comprises the flat spring-like strips with enlarged end portions indicated on the drawing at 11, 12, 13 and 14.

As illustrated, these cantilevers are secured at their ends having uniform thickness and in pairs to a respective one of the mounting plates 21 and 22, in parallel and spaced relation with the free ends of non-uniform thickness extending in opposite directions. For example, cantilevers 11 and 12 are shown secured at their ends by the bolts 15 to the supporting plate 21 so that the enlarged ends 11' and 12' extend in opposite directions. Similarly, the cantilevers 13 and 14 are shown bolted (at 15) to supporting plate 22 so that the free enlarged ends 13' and 14' thereof extend in opposite directions from their point of securement with the plate 22.

The second set of cantilevers consists of the flat spring-like strips illustrated on the drawing at 16, 17, 18 and 19. These strips are of uniform thickness except at the free ends 16', 17', 18' and 18', which are shown enlarged. Each of these cantilevers are secured at their uniform end portions and in pairs to the sensitive mass 10 on two substantially diametrically opposed sides, by means of the bolts 15', for example, with each pair being spaced apart so that the free ends extend parallel in opposite directions. For example, the cantilevers 16 and 17 are secured to the mass 10 at one side thereof spaced apart and in parallel relation so that free and enlarged ends 16' and 17' extend in opposite directions. Similarly, cantilevers 18 and 19 are secured to the side of said mass 10 opposite and substantially diametrically opposed to the point of securement for cantilevers 16 and 17. The cantilevers 18 and 19 are positioned side by side in parallel and spaced apart relation with the free ends 18' and 19' extending in opposite directions from their point of attachment to the mass 10.

A plurality of flat springs, indicated in the drawing at 23, 24, 25 and 26, are positioned above and below the sensitive mass 10 so as to extend generally in a direction normal to the extension of its straight-line motion, or path of movement. More specifically, springs 23 and 24 extend in parallel relation across the bottom portion of the sensitive mass 10 and are secured to the free ends of a respective one of the first and second set of cantilevers. More specifically, flat spring 23 is secured to the free and enlarged ends 11' and 19' of cantilevers 11 and 19 and flat spring 24 is secured to the free and enlarged ends 17' and 13' of the cantilevers 17 and 13. Likewise, the spring 25, which is positioned above the sensitive mass in a direction normal to the path of movement thereof, has its free ends secured to the cantilevers 14 and 16, whereas flat spring 26 is positioned parallel to spring 25 and has its free ends secured to the enlarged end portions 16' and 18' of the cantilevers 16 and 18.

It is possible, by means of the spring system described above, to provide a support for the sensitive mass 10 which will permit the mass 10 to move, in response to applied acceleration, in a linear direction with respect to the plate 21 and 22 with substantially no friction. It is to noted that the flat end springs 23, 24, 25 and 26 are thinner than the cantilevers 11 through 14. Accordingly, these end springs allow axial motion of the seismic element 10 relative to the plates 21 and 22. When an axial force proportional to the linear acceleration to which the mass 10 is subjected is applied to the mass, the mass becomes displaced relative to the plates 21 and 22; and the force is opposed by deflection in the end springs and a much smaller deflection in the cantilevers. If the force is not axial, the cantilevers, in conjunction with a fluid film between the mass 10 and the casing 40 (to be discussed subsequently), offer large resistance to the transverse component, and the motion is principally that due to the axial component of the force. This movement of the sensitive mass 10 is recorded on the paper 33 by attaching the mass to the recording arm 30 through the connector block 27 and connector extension 28. The record paper 33 is contained on a drum or supply spool 37 and is adapted to be moved in a general direction transverse to the direction of movement of the recorder arm 30 by means of the roller 35, which may be driven preferably at a constant speed by a motor 34 through the set of gears illustrated generally at 36. Details of the recorder are not involved in the present invention and are not herein described, although the operation of the recorder will be apparent considering that the pin arm 30 is pivoted at 32 and also has a pivotal connection 31 with the connecting arm 28. Since linear motion of the sensitive mass 10 imparts circular motion to the recording recorder arm 30, the record will not bear a direct linear relation with the displacement of the sensitive mass. Accordingly, a constant multiplication factor cannot be utilized, and a special scale must be devised for transcribing the record.

In the operation of the recorder the paper 33 is taken off the supply spool 37 and is passed over a suitable platen for backing up the recording surface, around the idler roller 38 and on to the driven spool 35, which is geared to the motor 34. In order to supply a drag to the supply spool 37, and thus keep suitable tension on the recording paper, a friction brake such as that illustrated diagrammatically at 39 is provided. In the type of recorder illustrated, the recording paper may not be driven at constant speeds and separate means must be utilized to produce a time indication on the record.

In Fig. 2 there is illustrated an accelerometer unit built in accordance with the present invention. The accelerometer, as illustrated, comprises a hollow cylindrical sensitive mass 10 contained within a cylindrical casing 40 and supported for linear movement relative to this casing by means of the spring system more particularly described in connection with Fig. 1. The spring system is secured to the casing 40 for supporting the accelerometer sensitive mass by bolting or otherwise securing the supporting plates 21 and 22 to the inside surface of the casing 40. More particularly, the cantilevers 12 and 13 are shown secured respectively to the mounting plates 21 and 22, the other two cantilevers 11 and 14 which are also secured to the mounting plate are not shown in the interest of clearness; also the cantilevers 19 and 16 cooperating with the cantilevers 11 and 14 are not shown.

The outer wall portions 41 of the cylindrical sensitive mass 10 are cut away at diametrically opposite locations and the more massive central portions 43 are machined to receive the cantilevers 17 and 18 which are secured thereto by means of the bolt 15', for example. The free ends of each of the cantilevers 17 and 18 extend in opposite directions relative to the point of attachment to the cylindrical mass and are secured respectively to the cantilevers 13 and 12 by means of the flat leaf springs 24 and 26. (The other leaf springs 23 and 25 are not shown in Fig. 2.)

In order to keep the fluid for damping the action of the sensitive mass within the casing 40, the casing is sealed by a pair of caps 44 and 45 which covers the ends of the cylindrical casing in a fluid-tight manner. Movement of the sensitive mass is transmitted to the recorder by means of a connector 27 which extends through an opening 46 of the end cap 44. Bellows 47 seals this opening and transmits movement of the connector 27 to the extension rod 28 which is in turn secured to the pivoted recorder arm 30. The cap 45 also has an opening 48 to which the circular frame 49 for the bellows 50 is secured so that the bellows 50 will project into the cylindrical casing. The rod 51 connects the end surface 52 of the bellows 50 with the sensitive mass 10 and transmits motion from this sensitive mass to the bellows 50. The bellows 50 thus compensates for any change in volume produced by the actuation of the bellows 47; and for this reason the bellows 50 extends inwardly of the casing 40 whereas the bellows 47 extends outwardly of the casing. Moreover, both bellows 47 and 50 should produce an equal change in volume per unit displacement.

The bellows 47 and 50 aid in increasing the overall stiffness of the system but have a slight departure from linearity. It was found, however, that the increased stiffness attributable to the bellows is a small part of the total so that no substantial change in overall linearity occurs as a result of the employment of the bellows.

A plurality of posts 53 positions an end plate 54 of the recorder assembly from the cap 44 to provide a space into which the recorder may be assembled and provides a support for the pivot 32, for example, as well as providing bearing surfaces for the spools 35, 37 and the idler roller 38. Fig. 2 is more specific in its illustration of the recorder mechanism of Fig. 1 in that it discloses the platen 55, which serves to back up the recording surface of the paper 33, and discloses also a spindle 56 which projects through the end plate 54 for attaching a crank or suitable mechanism to wind the recording tape 33 on to the supply spool 37.

It is found, from the actual construction of an accelerometer built in accordance with the embodiment illustrated in Fig. 2, that the spring system, employing cantilevers machined from solid steel stock to dimensions 2" in length, 3/8" wide, and 1/8" thick interconnected by flat spring cut from .044" roll stock to dimensions 3" long, and 3/8" wide, gives satisfactory stiffness and negligible loss of motion.

The invention herein described may be manufactured and used by or for the Government of the United States of America for governmental purposes without the payment of any royalties thereon or therefor.

I claim:

1. An accelerometer comprising in combination an inertia sensitive mass, a body, substantially frictionless means resiliently supporting said sensitive mass for linear movement relative to said body in a direction along an axis thereof, said means comprising a pair of flat springs positioned across the sensitive mass at an end thereof, a first related pair of generally parallel spring-like strips, each strip of said pair being disposed on opposite sides of said axis with each strip of said pair being secured respectively to said mass and said body at one end only thereof, the other ends being free to extend in like direction generally parallel to said axis and toward said springs to form a cantilever with their respective supporting member, a second related pair of generally parallel spring-like strips, each strip of said pair being disposed on opposite sides of said axis with each strip of said pair being secured respectively to said mass and said body at one end only thereof and in an order opposite to the order that said first related pair are secured, the other ends being free to extend in like direction generally parallel to said axis and toward said springs to form a cantilever with their respective supporting member, and the said other ends of said strips of each related pair being secured to a respective one of said springs.

2. An accelerometer comprising in combination an inertia sensitive mass, a body, substantially frictionless means resiliently supporting said sensitive mass for linear movement relative to said body in a direction along an axis thereof, said means comprising a pair of flat springs, each spring of said pair being positioned across the path of movement of said mass and at opposite sides thereof, a first related pair of generally parallel spring-like strips, each strip of said pair being disposed on opposite sides of said axis with each strip of said pair being secured respectively to said mass and said body at one end only thereof, the other ends being free to extend in like direction generally parallel to said axis and toward a first one of said pair of springs to form a cantilever with their respective supporting member, a second related pair of generally parallel spring-like strips, each strip of said pair being disposed on opposite sides of said axis, with each strip of said pair being secured respectively to said mass and said body at one end only thereof and in an order opposite to the order that said first related pairs are secured, the other ends being free to extend in like direction generally parallel to said axis and toward the second one of said pair of springs to form a cantilever with their respective supporting member, the other ends of said strip of said first pair being secured to said first one of said springs, and the other ends of said strips of said second pair being secured to said second one of said springs.

3. An accelerometer comprising in combination a sensitive mass, a body adapted to contain said sensitive mass, substantially frictionless means resiliently supporting said sensitive mass for linear movement relative to said body along its axis, said means comprising a first set of flat spring-like strips secured to said body in cantilever fashion with at least two cantilever springs having their free ends extending in opposed directions from said body on each side of said contained mass and generally parallel to said axis, a second set of flat spring-like strips secured in cantilever fashion on at least two substantially diametrically opposed sides of said mass, each of said opposed sides having said set comprising at least two parallel and spaced cantilevers, the free ends of which extend in opposed directions and generally parallel to said axis, a plurality of flat springs extending substantially normal to said axis, and means securing the ends of each of said flat springs respectively to a first and second set of said spring-like strips having their free ends extending in the same direction and on opposite sides of the axis of said mass.

4. An accelerometer comprising a fluid-tight casing containing a sensitive mass bathed in a damping liquid, substantially frictionless means resiliently supporting said sensitive mass for linear movement relative to said casing along an axis thereof, and means for transmitting said movement exteriorly of said casing preserving said fluid-tight integrity and presenting substantially no change in volume thereof, said means comprising a pair of bellows mounted at each end of said casing normal to said axis and secured respectively to said mass at opposite ends thereof in the direction of its movement, one of said bellows extending interiorly of said casing and the other of said bellows extending exteriorly of said casing.

HARRY C. MAYNARD.

REFERENCES CITED

The following references are of record in the file of this patent:

UNITED STATES PATENTS

| Number | Name | Date |
| --- | --- | --- |
| 1,702,456 | Trumpler | Feb. 19, 1929 |
| 2,033,127 | Dunlea | Mar. 10, 1936 |
| 2,108,695 | Tapley | Feb. 15, 1938 |
| 2,183,002 | Bach | Dec. 12, 1939 |
| 2,237,326 | Barry | Apr. 8, 1941 |
| 2,332,994 | Draper | Oct. 26, 1943 |

FOREIGN PATENTS

| Number | Country | Date |
| --- | --- | --- |
| 316,171 | Germany | Nov. 22, 1919 |